Dec. 7, 1937.     A. E. LARSEN     2,101,399
AIRCRAFT OF THE ROTATIVE WING TYPE
Filed Jan. 12, 1937     2 Sheets-Sheet 2

INVENTOR
Agnew E. Larsen
BY
Synnestvedt & Lechner
ATTORNEYS

Patented Dec. 7, 1937

2,101,399

UNITED STATES PATENT OFFICE 2,101,399

AIRCRAFT OF THE ROTATIVE-WING TYPE

Agnew E. Larsen, Kingston-on-Thames, England, assignor to Autogiro Company of America, Willow Grove, Pa., a corporation of Delaware Application January 12, 1937, Serial No. 120,155

14 Claims. (Cl. 244—100)

This invention relates to aircraft of the rotative wing type and particularly to aircraft of this type in which the rotor provides capability of approximately vertical descent to a landing and also generally vertical or "direct" take-off.

One of the principal objects of the invention is the provision, in an aircraft of the type referred to above, of landing gear arranged to adhere to the landing surface and thus prevent substantial movement of the craft on the ground upon landing.

More specifically, the invention contemplates the use of vacuum means, such as vacuum cups, as the alighting or landing elements for a craft of the character in question, the vacuum means being adapted to cooperate automatically with the landing surface upon contact therewith. Because of the above characteristics of my improved landing mechanism, the invention is especially useful in facilitating landing on small areas, such as "roof top" landing fields, and the decks of ships, and the like.

Still further, the invention provides for employment of shock absorption struts or the like, the same preferably being arranged to permit limited and cushioned movement of the vacuum cups with respect to the body of the machine, especially fore and aft thereof, so that if a landing is made with slight forward movement with respect to the landing surface, this movement will be yieldingly arrested.

For the purpose of facilitating take-off, the invention contemplates the use of valve means adapted to place the interior of the vacuum cups in communication with the atmosphere, just prior to making a take-off. This arrangement is of especial advantage in a craft of the type already mentioned since it permits "warming up" the engine, and initiating rotation of the rotor prior to take-off, with positive assurance that the machine will not move from a given location on the landing surface during these operations, and until the valves for the vacuum cups are opened.

How the foregoing, together with other objects and advantages are obtained, will appear more fully from a consideration of the following description referring to the accompanying drawings, in which—

Figure 1:
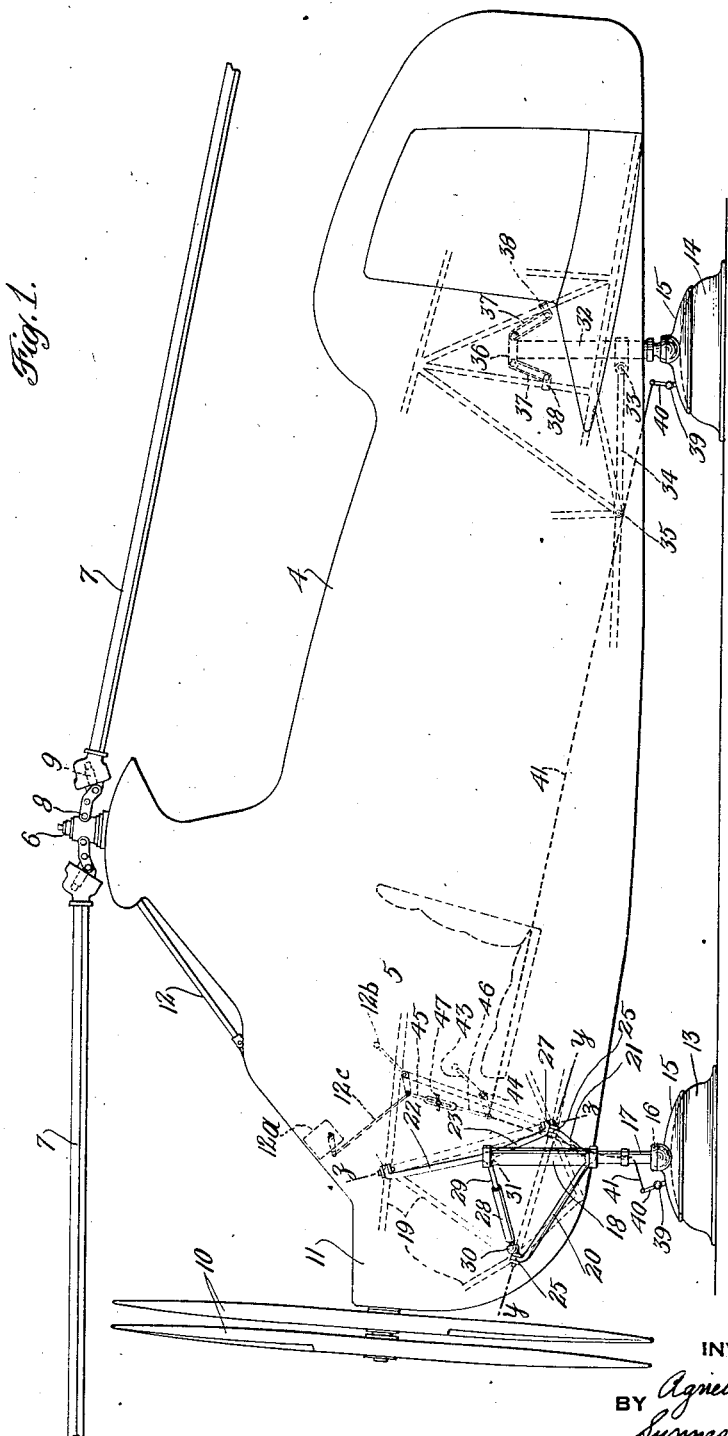
Figure 1 is an outline side elevational view of an aircraft having a sustaining rotor, which craft is equipped with the landing gear of the present invention.

In Figure 1 the body of the craft is shown at 4, there being an occupant's or pilot's compartment 5 therein above which the rotor hub 6 is mounted. The blades 7 of the rotor are articulated to the hub by means of substantially horizontal pivots 8 and obliquely inclined pivots 9. At the front of the machine a pair of tractor screws 10 are shown, these being adapted to be driven by a motor which may suitably be located in the nose 11 of the machine. The rotor may be driven by a mechanical interconnection between the engine and the rotor hub, a portion of this interconnection being shown at 12 and a clutch therefor being shown at 12a. A control lever 12b, and connection 12c to serve to operate the clutch.

The inclined or "drag" articulations 9 for the rotor blades are preferably arranged substantially in accordance with the disclosure of copending application Serial No. 738,349 of Juan de la Cierva, filed August 3, 1934, in order to provide for direct take-off of the machine from the ground without forward movement, by engaging clutch 12a and first over-speeding the rotor, with the blades at low incidence, to a point beyond its normal R. P. M., and then disconnecting the clutch and raising the pitch of the blades on the drag articulations. As fully disclosed in said copending application, this action may be automatically achieved by proper arrangement of the drag articulations and, in consequence thereof, the machine is caused to rise vertically from the ground or other supporting surface. In normal flight, the rotation of the rotor is maintained by autorotation, under which action, the machine may descend substantially vertically to a landing.

The landing gear includes a pair of forward cups 13 and preferably also a rear cup 14. Each cup is provided with a backing plate 15 having a socket therein adapted to receive the ball 16 mounted at the lower end of one element 17 of a support for the cup. By this means the cup is provided with freedom for tilting movement in all directions, so as to accommodate itself to irregularities in the alighting surface and also to permit tilting thereof during the act of landing, as when the tail cup 14 contacts with the ground before the forward cups 15, or vice versa.

The element 17 of the mounting for each of the forward cups constitutes one part of a shock absorber (the internal part in the ararngement shown), the other element of the shock absorber being shown at 18. Each shock strut is supported on fuselage framing elements, such as shown at 19 in Figure 1, by a pair of frames one of which includes struts 22 and 23. Each of these frames is of V-form, and the apex of the frame 20—21 is joined as by a ball and socket 24 with the lower end of the part 18 of the shock absorber. The other ends of the struts 20 and 21 are pivoted to the fuselage framing by pivot parts 25 providing a pivot axis y—y, as shown in Figure 1. The apex of the frame 22—23 is similarly coupled by means of a ball and socket 26 to the upper end of member 18. The other ends of the struts 22 and 23 are pivoted as at 27 to fuselage framing so as to provide a pivot axis z—z.

By virtue of this mounting, the upper end of the member 18 is permitted freedom for movement generally fore and aft of the craft, the universal or ball and socket 24 and the associated frame elements 20 and 21 swinging up and down as the frame 22—23 swings fore and aft. The arrangement thus provides freedom for movement of the cup fore and aft with respect to the body of the machine, and this movement is cushioned by a shock strut 28—29, the ends of which are coupled to fuselage framing and to the upper end of the member 18 by ball and socket joints 30 and 31 respectively.

Figure 2:
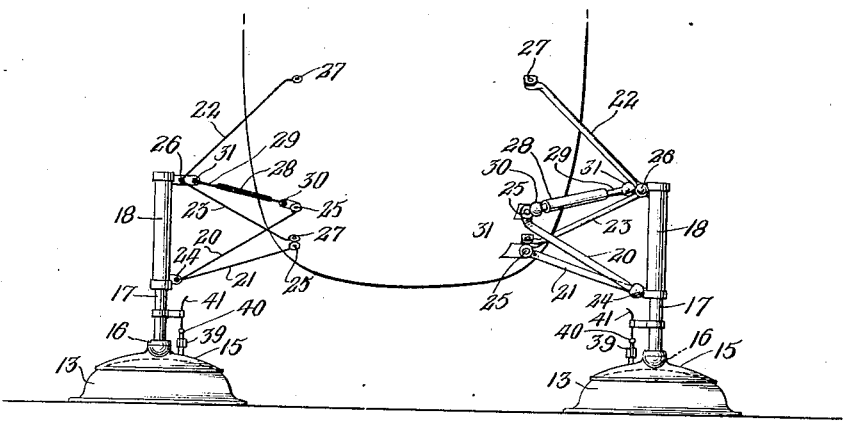
Figure 2 is a front view of a portion of the machine shown in Figure 1.
Figure 3:
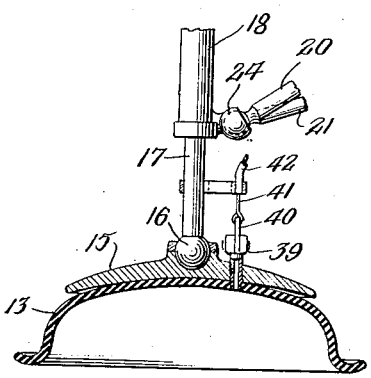
Figure 3 is a vertical sectional view through one of the vacuum cups and a portion of the mounting structure therefor, this view being on an enlarged scale.

In Figure 2 the framing elements and the like have been shown in full lines on one side of the machine only, repetition at the other side being indicated diagrammatically.

The mounting for the rear cup 14 includes an upright post 32 pivotally connected as at 33 to a frame or the like 34 which in turn is pivoted to fuselage framing as at 35, this mounting providing freedom for generally vertical movement of the cup 14. Toward its upper end, the post 32 is provided with a fitting 36, and shock cord or equivalent resilient or elastic material 37 is secured to the fitting 36 and extended in a direction generally downwardly therefrom for attachment to other fittings such as shown at 38—38 carried on fuselage framing elements. In consequence, vertical movement of the post 32 is cushioned by means of the shock cord, and in addition the post 32 is thereby permitted freedom for limited fore and aft tilting about the pivot 33.

It should be noted in connection with the resilience of the landing gear herein disclosed that in addition to the cushioning action provided by the shock struts, shock cord, etc., the cups themselves further add considerable resilience. For a craft of about 3000 pounds total weight, cups of approximately 15 inches diameter will be found to be sufficient and will give adequate adherence to prevent undesired movement of the craft on the landing surface, and at the same time considerable resilience and flexibility in compensating for irregular or rough landings.

For the purpose of permitting take-off, each cup is provided with a valve 39 operable by a lever 40, the several levers preferably being arranged for actuation by means of flexible push-pull cables 41 mounted in tubes 42, for example Bowden cables. These cables 41 are extended into the body of the craft and are preferably operable by means of a common control lever 43 which may be pivotally mounted as at 44.

A releasable interlock between the levers 12b and 43 is also provided, this interlock including a pair of members 45 and 46, the former connected to the lever 12b and the latter to lever 43. One of these members (45) is provided with an elongated slot through which projects the shank of a wing nut 47 carried by the other member. By this means the levers may be constrained to move in unison or may be operated independently, by tightening or loosening the wing nut 47.

In operation, assuming a take-off is to be made, the engine is first started and the clutch engaged to drive the rotor, preferably until its rotational speed exceeds the normal flight range, as disclosed, for example, in the copending application above referred to. During this period of drive of the rotor, the incidence of the blades is kept at a low value, approximating zero lift incidence, in accordance with said copending application, and then to effect the take-off, the incidence of the blades is increased and the control 43 is actuated to open the valves 39, thus placing the interior of the cups into communication with atmosphere, in order to permit the "direct" take-off.

During this take-off maneuver, the wing nut 47 may be tightened so as to permit disengagement of the clutch and opening of the valves 39 simultaneously by manipulation of either one of levers 12b and 43.

When returning to a landing, the valves 39 are closed by actuation of lever 43 (the wing nut 47 having been loosened) and the machine is brought toward the landing surface substantially vertically. When the cups contact with the landing surface they cooperate therewith to suctionally restrain the craft from subsequent movement with respect to the surface and prevent rebound or vertical displacement which might result from wind gusts, or in the case of a landing on the deck of a vessel, from movements of the vessel. It is obvious that such movements would be undesirable when alighting in any restricted space.

The vertical landing thrust is absorbed by the shock absorption means for each cup which is arranged to work in a generally upright direction, and in addition any slight fore and aft movement of the craft with respect to the alighting surface is cushioned, either by the shock struts 28—29, or by the shock cord 37.

I claim:

1. An aircraft including a sustaining rotor providing for substantially vertical descent, and landing gear having vacuum cup means adapted to cooperate with the landing surface upon contact therewith to restrict substantial movement of the craft on said surface.

2. An aircraft including a sustaining rotor providing for substantially vertical descent, and landing gear having vacuum cup means adapted to cooperate with the landing surface upon contact therewith to restrict substantial movement of the craft on said surface, the landing gear further including mounting means for the vacuum cup means providing freedom for limited and cushioned movement thereof with respect to the body of the craft.

3. An aircraft including a sustaining rotor providing for substantially vertical descent, and landing gear having vacuum cup means adapted to cooperate with the landing surface upon contact therewith to restrict substantial movement of the craft on said surface, the landing gear further including mounting means for the vacuum cup means providing freedom for limited and cushioned movement longitudinally thereof with respect to the body of the craft.

4. An aircraft including a sustaining rotor providing for substantially vertical descent, landing gear having a vacuum cup adapted to cooperate with the landing surface upon contact therewith, and the landing gear further including mounting means for the cup providing freedom for tilting thereof, whereby to accommodate the cup to irregularities in the landing surface.

5. An aircraft including a sustaining rotor providing for substantially vertical descent, landing gear having vacuum cup means adapted to cooperate with the landing surface upon contact therewith, and mechanism for mounting said cup means including a substantially upright shock absorber.

6. An aircraft including a sustaining rotor providing for substantially vertical descent, landing gear having a vacuum cup adapted to cooperate with the landing surface upon contact therewith, the landing gear further including mounting means for the cup having a substantially upright shock absorber, and a universal joint interconnecting the cup and the shock absorber.

7. An aircraft including a sustaining rotor providing for substantially vertical descent, landing gear having vacuum cup means adapted to cooperate with the landing surface upon contact therewith, mechanism for mounting said cup means including a substantially upright shock absorber, and means providing freedom for limited and cushioned movement of the cup means fore and aft with respect to the body of the craft.

8. An aircraft including a sustaining rotor providing for substantially vertical descent, landing gear having vacuum cup means adapted to cooperate with the landing surface upon contact therewith to restrict substantial movement of the craft on said surface, and valve means for opening the interior of the cup means to atmosphere.

9. An aircraft including a sustaining rotor providing for substantially vertical descent, landing gear having vacuum cup means adapted to cooperate with the landing surface upon contact therewith to restrict substantial movement of the craft on said surface, valve means for opening the interior of the cup means to atmosphere, and a manually operable control for said valve means in an occupant's compartment of the craft.

10. An aircraft including a sustaining rotor providing for substantially vertical descent, landing gear for the craft including a pair of forwardly located vacuum cups, a substantially upright shock absorber for mounting each cup, and means providing freedom for limited and cushioned movement of each cup generally fore and aft of the craft.

11. An aircraft including a sustaining rotor providing for substantially vertical descent, landing gear for the craft including a pair of forwardly located vacuum cups, a substantially upright shock absorber for mounting each cup, a third vacuum cup located rearwardly, and generally vertically reacting shock absorption means for mounting said third cup.

12. An aircraft including a sustaining rotor providing for substantially vertical descent, landing gear for the craft including a pair of forwardly located vacuum cups, a substantially upright shock absorber for mounting each cup, a third vacuum cup located rearwardly, generally vertically reacting shock absorption means for mounting said third cup, and, for each cup, means providing freedom for limited and cushioned movement thereof generally fore and aft with respect to the body of the craft.

13. An aircraft including a sustaining rotor, disconnectible means for driving the rotor with the blades thereof at low incidence, means for raising the incidence of the blades when the drive is disconnected, landing gear having vacuum cup means adapted to cooperate with the landing surface upon contact therewith, valve means for opening the interior of the cup means to atmosphere, and means interlocking the operation of said valve means and said disconnectible drive means providing for joint disconnection of the drive and opening of the valve means.

14. An aircraft including a sustaining rotor, disconnectible means for driving the rotor with the blades thereof at low incidence, means for raising the incidence of the blades when the drive is disconnected, landing gear having vacuum cup means adapted to cooperate with the landing surface upon contact therewith, valve means for opening the interior of the cup means to atmosphere, means interlocking the operation of said valve means and said disconnectible drive means providing for joint disconnection of the drive and opening of the valve means, and means providing for independent operation of the disconnectible drive means and the valve means.

AGNEW E. LARSEN.